(12) United States Patent
Misfatto

(10) Patent No.: US 9,885,588 B2
(45) Date of Patent: Feb. 6, 2018

(54) DEVICE FOR DETECTING THE STATE OF A LEAF OF DOORS, GATES AND THE LIKE

(71) Applicant: MICROHARD S.R.L., San Vittore Olona (IT)

(72) Inventor: Jan Misfatto, San Vittore Olona (IT)

(73) Assignee: MICROHARD S.R.L., San Vittore Olona (IT)

( * ) Notice: Subject to any disclaimer, the term of this patent is extended or adjusted under 35 U.S.C. 154(b) by 143 days.

(21) Appl. No.: 14/780,220

(22) PCT Filed: Mar. 26, 2014

(86) PCT No.: PCT/EP2014/056037
§ 371 (c)(1),
(2) Date: Sep. 25, 2015

(87) PCT Pub. No.: WO2014/154738
PCT Pub. Date: Oct. 2, 2014

(65) Prior Publication Data
US 2016/0054148 A1 Feb. 25, 2016

(30) Foreign Application Priority Data
Mar. 27, 2013 (IT) .............................. MI2013A0460

(51) Int. Cl.
*G01D 5/14* (2006.01)
*E06B 7/28* (2006.01)
*E05B 47/00* (2006.01)
(Continued)

(52) U.S. Cl.
CPC .............. *G01D 5/14* (2013.01); *E05B 39/00* (2013.01); *E05B 47/0615* (2013.01); *E06B 7/28* (2013.01);
(Continued)

(58) Field of Classification Search
CPC ....... G01D 5/14; E05B 39/00; E05B 47/0615; E05B 17/22; E05B 81/64; E05B 81/08; E05B 81/12; E05B 81/56; G08B 13/08; G08B 13/26; G08B 13/2491
See application file for complete search history.

(56) References Cited

U.S. PATENT DOCUMENTS 6,472,993 B1    10/2002   Kenneth et al.
2010/0019902 A1  1/2010   Mullet
(Continued)

FOREIGN PATENT DOCUMENTS

CH        701503 A1     7/2009
DE    102008022276 A1   11/2009
(Continued)

OTHER PUBLICATIONS

International Search Report dated Jun. 23, 2014 corresponding to International Appln. No. PCT/EP2014/056037.
(Continued)

*Primary Examiner* — Helen Kwok
(74) *Attorney, Agent, or Firm* — Scully, Scott, Murphy & Presser, P.C.

(57) ABSTRACT

A device for detecting the state of a leaf of doors, gates or the like, including a magnetometer that can move with respect to a reference geometric plane that has a substantially fixed orientation with respect to an external magnetic field, the magnetometer being connected to a control unit that is configured to produce a movement of the magnetometer with respect to a preset position, on the basis of a measurement of the external magnetic field which is detected by the magnetometer; in addition or as an alternative to the magnetometer, the device can include an accelerometer.

11 Claims, 3 Drawing Sheets

(51) Int. Cl.
*G08B 13/08* (2006.01)
*E05B 39/00* (2006.01)
*E05B 47/06* (2006.01)
*G01P 15/02* (2013.01)
*E05B 45/06* (2006.01)
*E05B 17/00* (2006.01)

(52) U.S. Cl.
CPC .............. *G01P 15/02* (2013.01); *G08B 13/08* (2013.01); *E05B 2017/0095* (2013.01); *E05B 2045/067* (2013.01); *E05B 2047/0065* (2013.01); *E05B 2047/0068* (2013.01); *E05B 2047/0069* (2013.01); *E05B 2047/0092* (2013.01)

(56) References Cited

U.S. PATENT DOCUMENTS

| | | | | |
|---|---|---|---|---|
| 2011/0043362 | A1* | 2/2011 | Reibel | G07C 9/00103 340/541 |
| 2016/0032624 | A1* | 2/2016 | Bendel | E05D 11/08 49/31 |
| 2016/0189526 | A1* | 6/2016 | Kennedy | G08B 13/08 340/541 |
| 2016/0189528 | A1* | 6/2016 | Lee | G08B 25/008 340/541 |
| 2016/0231349 | A1* | 8/2016 | Scheiermann | G08B 13/08 |

FOREIGN PATENT DOCUMENTS

| | | |
|---|---|---|
| DE | 202010010852 U1 | 11/2011 |
| GB | 2463943 A | 4/2010 |
| WO | 2011141056 A1 | 11/2011 |
| WO | 2012041471 A1 | 4/2012 |

OTHER PUBLICATIONS

Italian Search Report dated Jan. 24, 2014 corresponding to Italian Patent Appln. No. ITM120130460.

* cited by examiner

DEVICE FOR DETECTING THE STATE OF A LEAF OF DOORS, GATES AND THE LIKE

The present invention relates to a device for detecting the state of a leaf of doors, gates or the like, which is particularly adapted to be installed in mechatronic locks.

In applications like access control to buildings or in applications that involve personal security or detention, it is necessary to know the open, closed, and securely closed state of a door or of a gate.

With particular reference to mechatronic locks, these are usually powered by batteries and, thus, the mechanism for detecting the state of the door must have low energy consumption. Furthermore, the materials the doors and the locks are made of are very different and, as a consequence, the method of detecting the state of the door must be adapted to the different materials used, such as wood and magnetic or non-magnetic metals.

Usually the mechanisms to detect the state of the doors are of two types. The first type is based on devices that are applied externally to the leaves, such as mechanical switches or sensors, which are usually connected via cable or via radio to a controller. These devices are constituted by two parts, one of which is installed on the wall or on the jamb and the other is installed on the leaf proper. The sensor detects when the leaf is moved from the closed position to the open position, for example by detecting the change of state of a mechanical switch.

The second type of detection mechanism consists of devices that can be installed inside the mechatronic lock proper and which use their own electronic circuits to control and report the state of the door. These mechanisms usually use magnetic sensors, like reed switches or Hall effect sensors, which detect the presence of a magnet arranged on the jamb of the door, generally applied close to or behind the complementary plate of the spring latch or of the sliding latch. A drawback of these solutions is that there must be a good alignment and a small distance between the sensor in the lock and the magnet in the jamb, so as to have a reliable detection of the open/closed state of the door.

Another type of mechatronic lock, known as a "cylinder with electronic knob", uses a magnet or the like arranged in the jamb in a position that, when the door is closed, is facing toward the screw that fixes the cylinder to the leaf, similar to the one indicated with 18 in FIG. 2 and adapted, for example, to be magnetized when arranged close to the magnet, in order to convey the magnetic field toward a sensor arranged in the cylinder body 17. Therefore, it is necessary to install further electronic components inside the cylinder body 17, since that, usually, the main electronic board is positioned inside the knob. This involves problems of electrical connection, given that the knob that contains the main electronic board can rotate with respect to the cylinder body.

The aim of the present invention is to overcome the drawbacks of the known art, by devising a device for detecting the state of a leaf of doors, gates or the like which simplifies the operations associated with its installation and which increases the security of the detection of the state.

Within this aim, an object of the invention is to provide a device for detecting the state of a leaf of doors, gates or the like which can be installed entirely on the leaf of the door.

Another object of the invention is to provide a device for detecting the state of a leaf of doors, gates or the like which can be used in mechatronic locks powered by battery and which has low energy consumption.

Another object of the invention is to obtain a device for detecting the state of a leaf of doors, gates or the like which, in addition to the open or closed state of the leaf, is also capable of detecting the securely closed state, i.e. with the spring latch and/or the sliding latch of the lock extracted.

Another object of the invention is to obtain a device for detecting the state of a leaf of doors, gates or the like which is adapted to detect break-in alterations aimed at defeating the device.

Another object of the invention is to provide a device for detecting the state of a leaf of doors, gates or the like which is highly reliable, is relatively easy to provide and can be installed at low cost.

This aim and these and other objects which will become better apparent hereinafter, are achieved by a device for detecting the state of a leaf of doors, gates or the like, characterized in that it comprises a magnetometer, said magnetometer being movable with respect to a reference geometric plane and being optionally rotatable with respect to an axis, said geometric plane having a substantially fixed orientation with respect to an external magnetic field, said magnetometer being connected to a control unit configured to produce a movement of the magnetometer with respect to a preset position, on the basis of a measurement of said external magnetic field detected by said magnetometer.

In addition or as an alternative to the magnetometer, the device according to the invention can comprise an accelerometer that is movable with respect to a geometric plane and is optionally rotatable about an axis, said accelerometer being connected to a control unit that is configured to produce a movement of the accelerometer with respect to a preset initial position, on the basis of temporal integrations of the measurements of the accelerations detected by said accelerometer.

Further characteristics and advantages of the invention will become better apparent from the description of a preferred, but not exclusive, embodiment of the device according to the invention, which is illustrated by way of non-limiting example in the accompanying drawings wherein.

Figure 1:
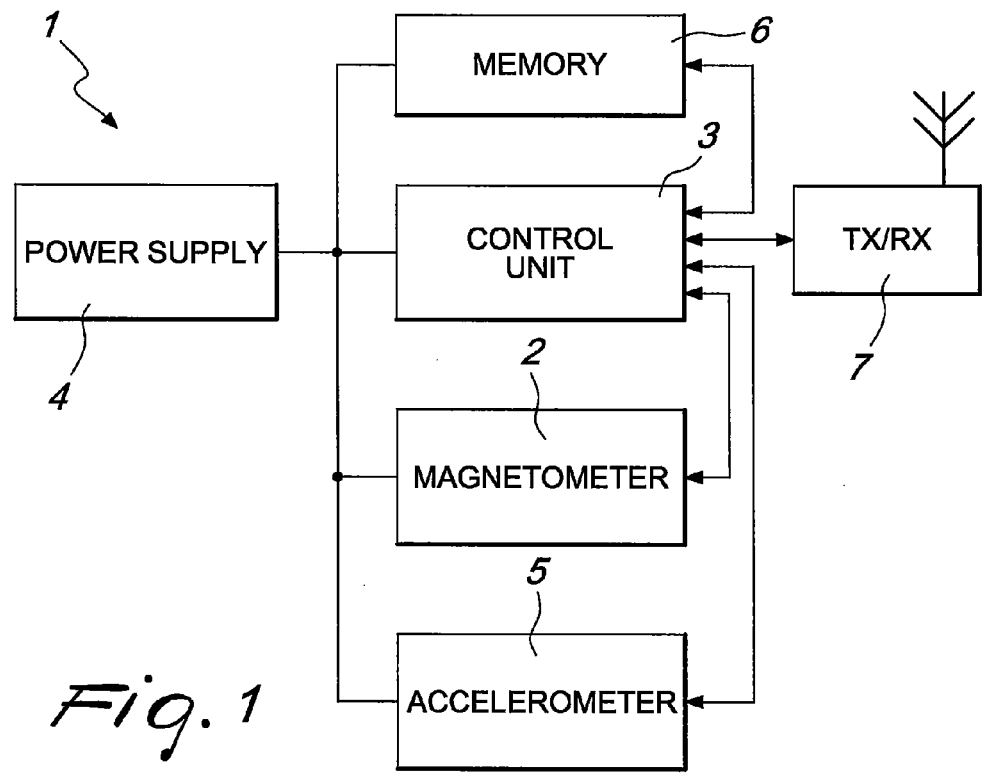
FIG. 1 is a diagram of a circuit according to a preferred embodiment of the invention.

With reference to the figures, a device for detecting the state of a leaf of doors, gates or the like according to the invention, generally designated by the reference numeral 1, is mounted on the leaf 10 of a door so as to be integral with the rotation of such leaf about the pivoting axis 11 of the leaf 10 on the corresponding jamb 12.

The device 1 can comprise at least one magnetometer 2 which, being integral with the leaf 10, can move on or parallel to a Cartesian geometric plane, x'-y', that is substantially perpendicular to the pivoting axis 11 of the leaf 10.

Externally to the device 1 and to the leaf 10 there is a magnetic field $\vec{B}$, which can be the terrestrial magnetic field or it can be conveniently generated locally or remotely with respect to the door, provided the field can be detected by the magnetometer 2. This external magnetic field $\vec{B}$ has an intensity, a direction and an orientation that are substantially fixed and are known at the time of installing the device 1 on the leaf 10, so that at any time the external magnetic field $\vec{B}$ is known to the device 1 and has a substantially fixed orientation with respect to the x'-y' geometric plane.

For convenience, the Cartesian reference system with respect to which the characteristics of the vector of the known external magnetic field $\vec{B}$ (intensity, direction, orientation) remain substantially constant is the one designated with x'-y'-z', where z' coincides with the pivoting axis 11 of the leaf 10, x' goes from one upright of the jamb 12 to the other, and the y' axis is perpendicular to the x'-z' plane. In the figures, the point of origin of such reference system x'-y'-z' lies on the floor.

The magnetometer 2 is connected to a control unit 3, for example a programmable microcontroller, which is powered by a source 4, for example a battery, that also powers the magnetometer 2 and is configured to detect a movement of the magnetometer 2, and thus of the leaf 10, with respect to a preset position, on the basis of the measurement of the external magnetic field $\vec{B}$ detected by the magnetometer 2 with respect to the measurement detected by the magnetometer 2 in such preset position and stored in a memory 6.

Such preset position is the one corresponding to the closed state of the leaf 10, i.e. the one in which the leaf 10 is coplanar to the plane of the opening that the leaf is deployed to obstruct, in this case the plane surrounded by the jamb 12.

In the closed state the spring latch (not shown) and/or the sliding latch 113 of the lock mounted on the leaf 10 are aligned with the respective openings of the complementary plate 14 fixed to the jamb 12. From the closed state of the leaf 10 it is thus possible to pass to the "securely closed" state, in which the leaf 10 is prevented from rotating, for example because the sliding latch 113 of the lock of the leaf 10 is inserted in the corresponding seat of the complementary plate 14.

The magnetometer 2 is of the vector type and is capable of measuring at least one vector component, preferably two or even three mutually perpendicular vector components, of the external magnetic field $\vec{B}$. The magnetometer 2 defines, thus, a set of three Cartesian axes, x, y and z, which are integral with the magnetometer 2 and along which the magnetometer 2 measures the components of intensity of the external magnetic field $\vec{B}$.

Figure 3:
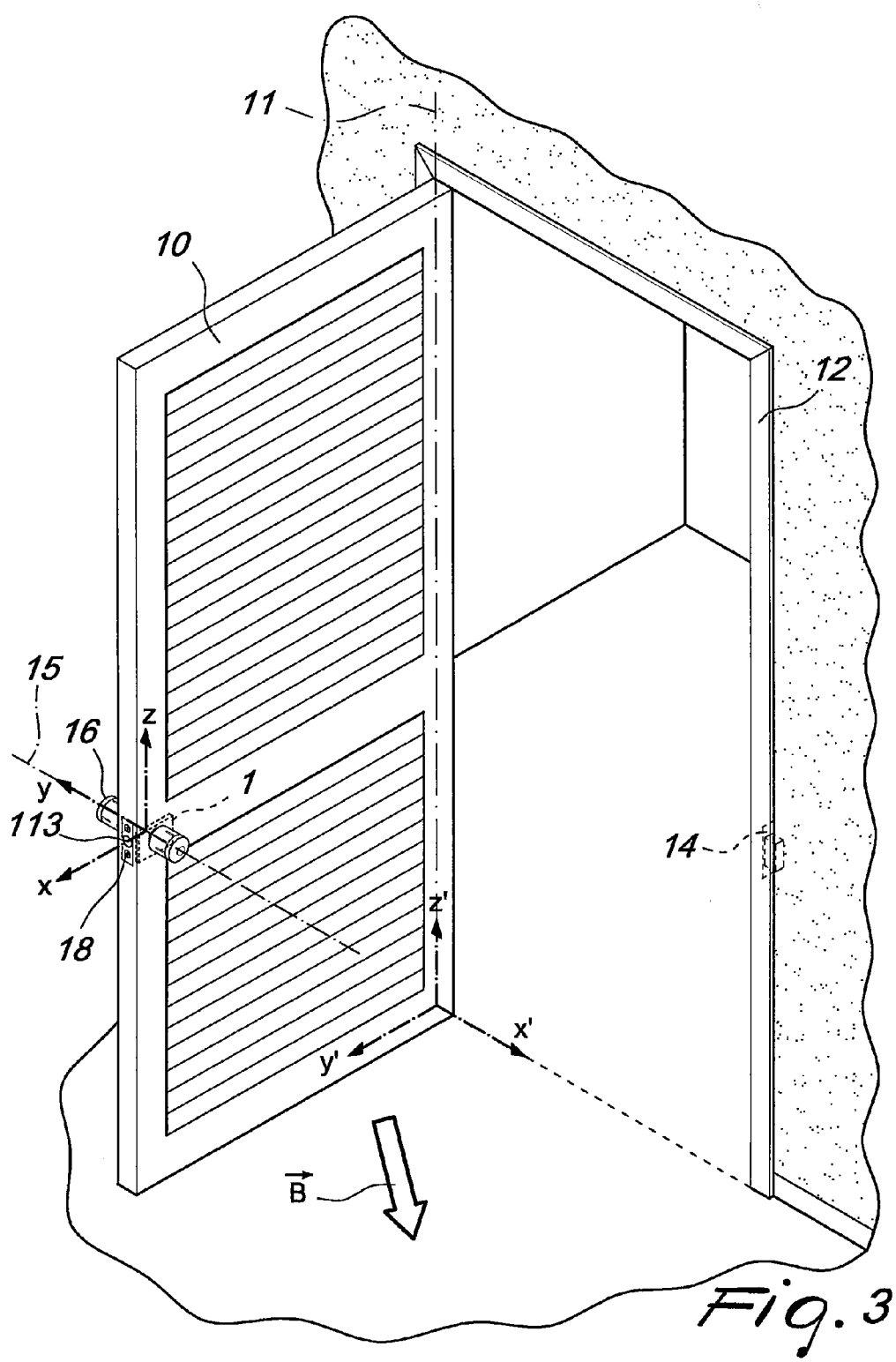
FIG. 3 is a leaf of a door in which the device in FIG. 1 is installed.
Figure 4:
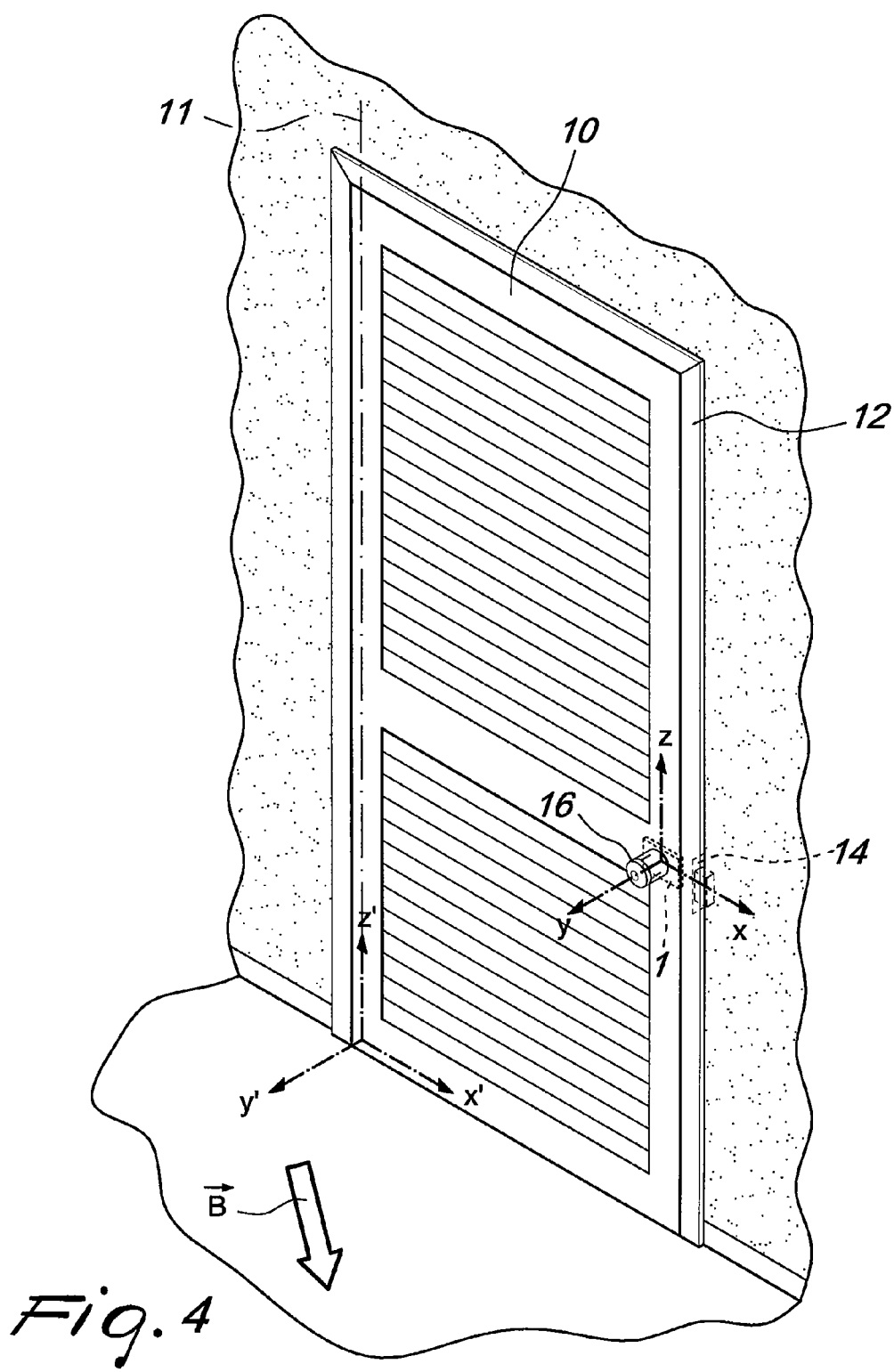
FIG. 4 is the leaf in FIG. 3 in the closed position.

In FIG. 3 the magnetometer 2 is mounted on the leaf 10 so that the y axis coincides with the rotation axis 15 of a knob 16 that, in the specific example shown, is the knob of a cylinder 17, fixed in the leaf 10 by way of a screw 18 and adapted to move a pusher 13 of the sliding latch 113. The z axis is parallel to the pivoting axis 11 of the leaf and the x axis is perpendicular to the y-z plane.

The movement of the magnetometer 2 along the circular arc that the Cartesian x-y-z system defines with the movement of the leaf 10 with respect to the Cartesian x'-y'-z' system is detected by the control unit 3 on the basis of a comparison of the measurement of the vector components of the field $\vec{B}$ along the x, y and z axes with a reference measurement made in the preset position of the magnetometer 2, i.e. in the closed state of the leaf 10 defined above.

In particular, when the control unit 3 detects that the intensity on the y axis of the external magnetic field $\vec{B}$ measured by the magnetometer 2 changes with respect to the corresponding intensity in the preset position, i.e. the intensity stored in the memory 6, then the control unit 3 detects that the leaf has been rotated in the x'-y'-z' system, by being brought from a closed state to an open state.

Thus, with the detection of a change of the intensity measured on the y axis with respect to the stored measurement on the same axis in the closed position, the device 1 detects the open state of the leaf 10. This detection can serve simply to indicate that a door is open, or it can serve to prevent the activation of the mechatronic lock in which the device 1 is installed.

Optionally, in practical implementations that involve a knob, the rotation axis 15 of the knob might not coincide with any of the x, y and z axes along which the magnetometer 2 measures the components of the magnetic field, since the magnetometer 2 is mounted around the axis 15 but does not coincide precisely with it. In this case, in order to find the orientation of the leaf 10 with respect to the external magnetic field $\vec{B}$, the measurements of intensity of the external magnetic field $\vec{B}$ along all three axes, x-y-z, are obtained from the magnetometer 2. The vector measurement performed on the x-y-z triplet of the external magnetic field $\vec{B}$, which optionally takes account of the fact that the magnetometer 2 can describe a circular arc when the knob is rotated, makes it possible to arrive at the physical position of the leaf 10 with respect to the x'-y'-z' axes.

The measurement received and processed by the control unit 3 can be a digital value or a voltage level that represent the intensity of the magnetic field measured on each axis, x, y and z, of the magnetometer 2.

Optionally, the memory 6 can be used to store, at the time of installing the device 1 on the leaf 10, a plurality of reference measurements of the Cartesian components of the external magnetic field $\vec{B}$ which are read by the magnetometer 2 at respective positions of the leaf 10.

In fact, the magnetic field read by the magnetometer 2 is specific to each individual installation, in that the environmental conditions, such as for example the material used to make the walls, the jamb 12, the lock and the complementary plate 14, and their mutual positions, are different for every door. As a consequence, it is possible to characterize the magnetic field read by the magnetometer 2 by measuring and storing the intensity and angle of the external magnetic field in the various different positions of the leaf 10, open or closed, and at certain angles of rotation of the x-y plane with respect to the x'-y' plane. This method of characterization of the magnetic field makes it possible to prevent the detection of the state of the door from being easily defeated by way of magnetic field sources, such as for example magnets arranged proximate to the mechatronic lock in which the device according to the invention is installed, and it likewise makes it possible to know the position of the leaf 10 with respect to the reference system, x'-y'-z'.

From a comparison performed by the control unit 3 with the stored reference values of the field $\vec{B}$ that are expected for different angles of the leaf 10 with respect to the closed position, it is possible to detect, recognize and optionally report, to a centralized control system, for example via radio by way of a communication unit 7 connected to the control unit 3, a possible attempt to defeat the system for detecting the state of the door using additional magnetic field sources that alter the characteristic magnetic field $\vec{B}$ of the door.

By programming the control unit 3 it is possible, furthermore, to calibrate, by way of appropriate thresholds, the measured differences in intensity of the vector components of the external magnetic field $\vec{B}$ that define the open state, for example so as to prevent activation of the lock even when the sliding latch 113 is only partially aligned with the corresponding seat defined in the jamb 12.

Alternatively, the control unit 3 can determine the angle A that is formed by the plane of the leaf 10 with respect to the plane of the opening defined by the jamb 12 and verify whether such angle is comprised within a certain range. For example, we can define that the state of the leaf 10 is closed if the angle A of the Cartesian x-y-z system with respect to the Cartesian x'-y'-z' reference system is comprised between −1 and +1 sixtieths of a degree.

If the magnetometer 2 is integral with the knob 16 as described above, i.e. with the y axis that coincides with the rotation axis 15 of the knob 16, then the measurements of the components of the external magnetic field $\vec{B}$ that are of interest for determining the angle A are those on the y and x axes. In practice, if the magnetometer 2 is mounted on the knob 16 at the rotation axis 15 or within a relatively small neighborhood of such rotation axis (indicatively within a radius of less than or equal to 2.5 cm from the axis 15), in order to determine the angle A it is sufficient to measure only one component of the external magnetic field $\vec{B}$, i.e. the component along the x axis, or the y axis, or the z axis. The range about the y axis within which the magnetometer 2 can be positioned in order to perform the measurement of only one component of the magnetic field depends substantially on the variation of the magnetic field $\vec{B}$ within that range. If such variation is small, it can be ignored and thus we can ignore the fact that the magnetometer 2 moves along a circumference having the axis 15 as its center during the rotation performed by the knob 16.

If the y axis of the magnetometer 2 does not coincide with the rotation axis 15 of the knob 16 and the variation of the external magnetic field $\vec{B}$ in a neighborhood of the axis 15 cannot be ignored, then it will be necessary that said magnetometer 2 measure the components of the magnetic field along all of the x-y-z axes.

Advantageously, if the magnetometer 2 is integral with the knob 16 as described above, the tri-axial nature of the detection of the magnetometer 2 can be used to determine the securely closed state of the leaf, i.e. that the rotation has occurred of the knob 16 in order to move the sliding latch. In this case, the additional component of the external magnetic field $\vec{B}$ which is monitored by the control unit 3 is the one along the z axis.

Preferably, the device 1 according to the invention can comprise, in addition or as an alternative to the magnetometer 2, an inertial sensor, in particular an accelerometer 5, which is connected to the control unit 3 and is integral with the leaf 10.

The presence of the accelerometer 5 makes it possible to detect the accelerations undergone by the leaf 10, since it is integral therewith, and, in particular, by its lock. These accelerations can be caused by the rotation to open/close the leaf 10, i.e. by the rotation of the x-y plane with respect to the x'-y' plane, or by impacts undergone by the mechatronic lock in which the device 1 is installed, or by impacts undergone by the leaf 10 and transferred from the leaf 10 to the mechatronic lock.

Figure 2:
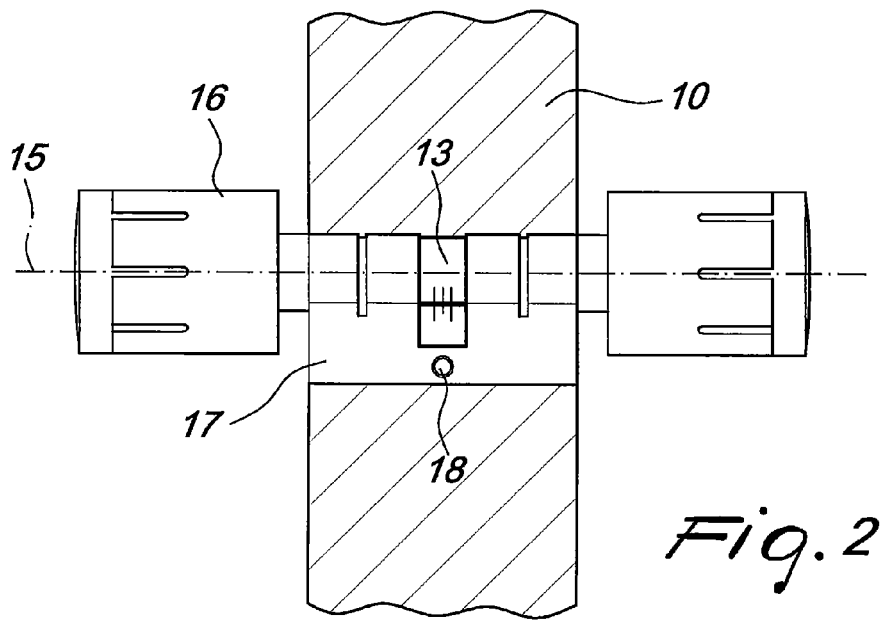
FIG. 2 is a side view of a cylinder with an electronic knob.

With particular reference to cylinders with a knob, such as the one shown in FIG. 2, by way of the accelerometer 5 fixed on the knob 16 the control unit 3 can detect the rotation of the knob 16 in the x-z plane since an accelerometer is capable of measuring the terrestrial gravitational field along the x-y-z axes. As a consequence it is possible to determine the angle of rotation of the magnetometer 2 with respect to the axis 15 as well, when the magnetometer 2 is also integral in rotation with the knob 16. This information, added to the information deriving from the measurement of the components of the external magnetic field $\vec{B}$ along the x-y-z axes by way of the magnetometer 2, makes it possible to determine the orientation of the leaf 10 with respect to the external magnetic field $\vec{B}$ and as a consequence establish the position, whether open, closed, or in whatever intermediate position it is in.

Optionally, the control unit 3, again by way of the accelerometer 5, can detect the number of turns made by the knob 16 about its axis 15 and consequently determine whether the lock has been brought to the secure state. In certain types of mechanical locks, in fact, the sliding latches are completely extracted only after a certain number of turns of the knob. So, if we know the closed state of the leaf by measuring the external magnetic field $\vec{B}$, and if we detect the number of turns, i.e. the number of completed turns of the knob 16, it is possible to say whether the leaf 10 is in the "securely closed" state.

The accelerometer 5, like the magnetometer 2, can also be used as a mechanism for the detection of tampering. The accelerometer 5 detects, in fact, if the lock is subjected to impacts or to vibrations, and therefore to oscillations that can be ascribed to a tampering attempt, and the control unit 3, on the basis of the measurement received from the accelerometer 5, can send an appropriate signal to a centralized control system, for example via radio.

Advantageously, the accelerometer 5 can be used to save energy. In fact, the magnetometer 2 could require a high level of energy for operation, which is incompatible with its use in battery-powered mechatronic locks.

It is thus possible to activate the measurement of the magnetic field $\vec{B}$ only at certain times by way of the accelerometer 5. In particular, one way to activate the measurement of the magnetic field can be to use the accelerometer to detect the impact of the leaf 10 against the jamb 12 and subsequently activate, by way of the control unit 3, the measurement of the magnetic field by the magnetometer 2.

Another way to selectively activate the measurement of the magnetic field is to detect, again using the accelerometer 5, the impact caused by the spring latch of the lock, not shown in the drawings. In fact, in general, the spring latch is connected to a spring that is loaded the moment the door is closed and the spring latch slides against the complementary plate 14. In this step, the spring latch is pushed into the lock by the complementary plate 14 and the spring that bears it is compressed. The moment the spring latch is aligned with the corresponding hole in the complementary plate 14, the energy accumulated through the compression of the spring will be released and the spring latch will be extracted, performing a rapid movement until it arrives at the end of its mechanical stroke. The impact of the spring latch against its mechanical arrest will be detected by the accelerometer 5, which as a consequence will activate the measurement of the magnetic field.

Independently of the presence of the magnetometer 2, the accelerometer 5 can also be used to determine the angle A at which the leaf 10 is open with respect to a preset initial position, for example the closed position. To this end, the control unit 3 can be configured to integrate the acceleration measurements and the consequent velocities over time, thus deriving the distance traveled along the circumference followed by the accelerometer 5 and, consequently, the center angle A that intercepts the circular arc traveled.

Optionally, if a multi-axis accelerometer is used, then in the same way the control unit 3 can calculate the angle of rotation of the knob 16 about the axis 15 with respect to an initial angle, by integrating the components of the acceleration along the axes of the accelerometer 5 over time and then integrating the velocities obtained.

This method can also be used to determine the number of turns of the knob.

The memory 6 can be used to store a plurality of measurements made by the accelerometer 5 during calibration and subsequently processed by the control unit 3 in order to detect break-in and/or functional impacts undergone or generated by the leaf 10 and/or by a corresponding lock or cylinder with a knob and rotations of the leaf 10 or of the knob 16.

In practice it has been found that the device according to the invention fully achieves the set aim and objects, in that it makes it possible to simplify the installation operations of a system for detecting the state of a door. In fact, it is no longer necessary to install sensors or magnets in the jamb in close proximity to the edge of the leaf, or to perform complicated operations of alignment with corresponding elements that are present on the lock.

By using an external magnetic field with known characteristics during installation, it is possible to mount the device for detecting the state of the door on the leaf only, and preferably on the mechatronic lock, simultaneously obtaining better security against attempts at tampering.

Furthermore, in addition to the open or closed state of the leaf, the device according to the invention is capable of precisely reading the securely closed state of the door as well, thus facilitating operations to monitor the states of doors.

The device, thus conceived, is susceptible of numerous modifications and variations, all of which are within the scope of the appended claims. Moreover, all the details may be substituted by other, technically equivalent elements.

In practice, the materials employed, as well as the dimensions, may be any according to requirements and to the state of the art.

The disclosures in Italian Patent Application No. MI2013A000460 from which this application claims priority are incorporated herein by reference.

Where technical features mentioned in any claim are followed by reference signs, those reference signs have been included for the sole purpose of increasing the intelligibility of the claims and accordingly, such reference signs do not have any limiting effect on the interpretation of each element identified by way of example by such reference signs.

The invention claimed is:

1. A device for detecting the state of a leaf of doors or gates comprising a knob rotatable about its own axis perpendicularly to a plane and a magnetometer fixed on said knob, said magnetometer being movable with respect to a reference geometric plane and being rotatable with respect to said axis of rotation of said knob, said geometric plane having a substantially fixed orientation with respect to an external magnetic field, said magnetometer being connected to a control unit of the device, said control unit being configured to determine a movement of the magnetometer with respect to a preset position, on the basis of a measurement of said external magnetic field detected by said magnetometer, the device further comprising an accelerometer fixed on said knob, the accelerometer connected to said control unit for detecting the rotation of said knob in the plane and also to determine the angle of rotation of the magnetometer with respect to said axis of said knob.

2. The device according to claim 1, wherein said magnetometer is of the vector type and said measurement is a measurement of at least two mutually perpendicular vector components, of said external magnetic field.

3. The device according to claim 1, wherein said control unit is configured to determine said movement on the basis of a comparison of said measurement with a reference measurement in which the magnetometer is in said preset position, or in which the magnetometer is oriented in a preset manner with respect to said external magnetic field, wherein said preset position corresponds to a closed state of said leaf.

4. The device according to claim 1, wherein said external magnetic field is a terrestrial magnetic field.

5. The device according to claim 1, further comprising a memory that stores a plurality of reference measurements of said external magnetic field which are detected by said magnetometer and correspond to measurements of said external magnetic field which are detected by said magnetometer in respective positions of said magnetometer along a circular arc that is substantially parallel to, or lying on, said geometric plane, so as to detect the position of the leaf and/or break-in alterations of the external magnetic field.

6. The device according to claim 1, wherein said control unit is configured to determine a movement of the accelerometer with respect to an initial position, on the basis of temporal integrations of measurements of accelerations detected by said accelerometer.

7. The device according to claim 6, wherein said accelerometer is capable of measuring components of a terrestrial gravitational field along a Cartesian triplet that is integral with said leaf.

8. The device according to claim 1, further comprising a memory that stores a plurality of measurements of said accelerometer, which are subsequently processed by said control unit in order to detect break-in and/or functional impacts undergone or generated by the leaf and/or by a corresponding lock or cylinder with a knob and rotations of the leaf or of the knob.

9. The device according to claim 1, wherein said magnetometer is adapted to be powered or activated only if said accelerometer, detects a movement or an impact.

10. A leaf of doors or gates, comprising the device according to claim 1, wherein said leaf can rotate about an axis that is substantially perpendicular to said geometric plane, said magnetometer being integral with the knob of said leaf, said preset position coinciding with a closed position of said leaf.

11. The leaf according to claim 1, wherein said knob is of a cylinder with an electronic knob of said leaf, said control unit being configured to detect a number of rotations of said knob by way of said accelerometer and to determine whether said leaf is in a securely closed state on the basis of said number of rotations.

* * * * *